US011847418B2

United States Patent
Hu

(10) Patent No.: US 11,847,418 B2
(45) Date of Patent: *Dec. 19, 2023

(54) FEW-SHOT LANGUAGE MODEL TRAINING AND IMPLEMENTATION

(71) Applicant: DST Technologies, Inc., Kansas City, MO (US)

(72) Inventor: Hui Peng Hu, Oakland, CA (US)

(73) Assignee: DST Technologies, Inc., Kansas City, MO (US)

( * ) Notice: Subject to any disclaimer, the term of this patent is extended or adjusted under 35 U.S.C. 154(b) by 97 days.

This patent is subject to a terminal disclaimer.

(21) Appl. No.: 17/350,917

(22) Filed: Jun. 17, 2021

(65) Prior Publication Data

US 2021/0374354 A1 Dec. 2, 2021

Related U.S. Application Data

(63) Continuation of application No. 16/413,159, filed on May 15, 2019, now Pat. No. 11,062,092.

(51) Int. Cl.
*G06F 40/30* (2020.01)
*G06N 3/08* (2023.01)
*G06F 40/263* (2020.01)

(52) U.S. Cl.
CPC ............ *G06F 40/30* (2020.01); *G06F 40/263* (2020.01); *G06N 3/08* (2013.01)

(58) Field of Classification Search
None
See application file for complete search history.

(56) References Cited

U.S. PATENT DOCUMENTS

| 2008/0208567 A1* | 8/2008 | Brockett | G06F 40/253 |
| | | | 704/9 |
| 2009/0132504 A1 | 5/2009 | Vegnaduzzo et al. | |

(Continued)

FOREIGN PATENT DOCUMENTS

CN 107808660 A 3/2018

OTHER PUBLICATIONS

Morita, et al., "Morphological Analysis for Unsegmented Languages using Recurrent Neural Network Language Model", Morphological Analysis for Unsegmented Languages using Recurrent Neural Network Language Model, 2009, 6 pages (Year: 2009), 2009.

(Continued)

*Primary Examiner* — Quynh H Nguyen
(74) *Attorney, Agent, or Firm* — Perkins Coie LLP; Colin Fowler; Brian Coleman

(57) ABSTRACT

A technique making use of a few-shot model to determine whether a query text content belongs to a same language as a small set of examples, or alternatively provide a next member in the same language to the small set of examples. The related few-shot model makes use of convolutional models that are trained in a "learning-to-learn" fashion such that the models know how to evaluate few-shots that belong to the same language. The term "language" in this usage is broader than spoken languages (e.g., English, Spanish, German, etc.). "Language" refers to a category, or data domain, of expression through characters. Belonging to a given language is not specifically based on what the language is, but the customs or traits expressed in that language.

15 Claims, 6 Drawing Sheets

(56) References Cited

U.S. PATENT DOCUMENTS

| | | | |
|---|---|---|---|
| 2012/0296635 A1* | 11/2012 | Brockett | G06F 40/166 704/9 |
| 2014/0163959 A1 | 6/2014 | Hiebert et al. | |
| 2018/0143965 A1* | 5/2018 | Willson | G06F 40/30 |
| 2018/0165554 A1* | 6/2018 | Zhang | G06K 9/6256 |
| 2019/0073414 A1 | 3/2019 | Franceschini et al. | |
| 2019/0332667 A1* | 10/2019 | Williams | G06N 5/022 |
| 2019/0370389 A1* | 12/2019 | Blouw | G06F 40/30 |
| 2020/0192921 A1* | 6/2020 | Satterfield | G06F 16/3323 |
| 2020/0210746 A1* | 7/2020 | Mesmakhosroshahi | G06V 10/40 |

OTHER PUBLICATIONS

Socher, et al., "Reasoning With Neural Tensor Networks for Knowledge Base Completion", Reasoning With Neural Tensor Networks for Knowledge Base Completion, 2007, 10 pages (Year: 2007), 2007.

* cited by examiner

FEW-SHOT LANGUAGE MODEL TRAINING AND IMPLEMENTATION

CROSS-REFERENCE TO RELATED APPLICATIONS

This application is a continuation of U.S. patent application Ser. No. 16/413,159 filed May 15, 2019, which is incorporated by reference herein in its entirety.

TECHNICAL FIELD

The disclosure relates to artificial intelligence models and specifically those that are trained to evaluate a small batch of input.

BACKGROUND

Artificial intelligence models often operate based on extensive and enormous training models. The models include a multiplicity of inputs and how each should be handled. Then, when the model receives a new input, the model produces an output based on patterns determined from the data it was trained on. Language models often operate where a given sequence of words are provided (for example, the first few words of a sentence) and the model predicts the next word based on the introductory words in the sentence (often semantically).

DETAILED DESCRIPTION

Figure 1:
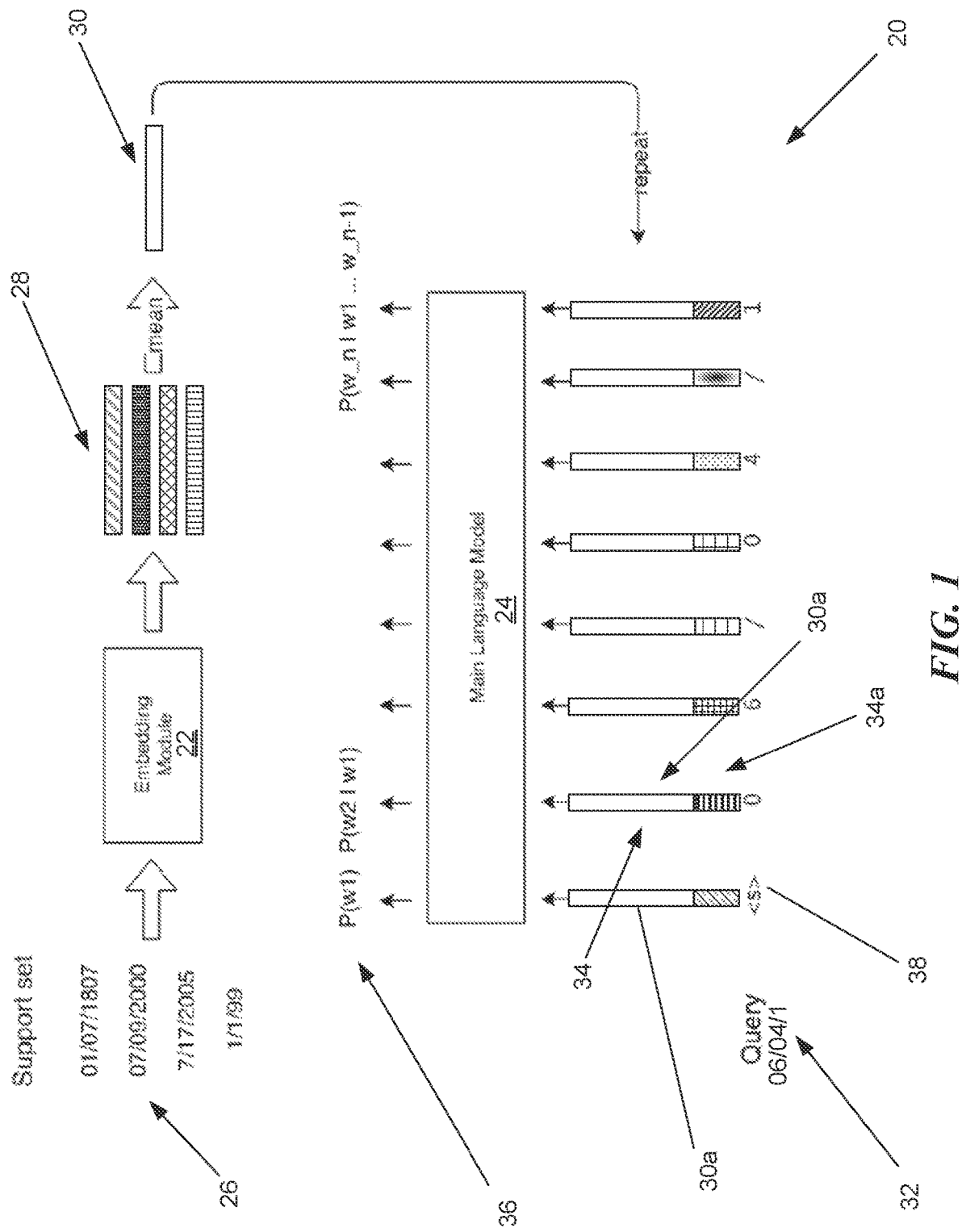
FIG. 1 is a block diagram of components included in a few-shot language model.

Embodiments disclosed herein include a language model that identifies whether a given input belongs with a previous small set of input. The term "few-shot" refers to a model that is trained to interpret a few sources of input data that the model has not necessarily observed before. Few-shot is shorthand for stating that the model has "a few shots" to determine what the user is seeking. "A few" does not necessarily refer to "three" as is often applied, but a relatively small number when compared to other models known in the art. Few-shot learning (FSL) refers to the training of machine learning algorithms using a very small set of training data (e.g., a handful of images), as opposed to the very large set that is more often used. This commonly applies to the field of computer vision, where it is desirable to have an object categorization model work well without thousands of training examples.

FSL is utilized in the field of computer vision, where employing an object categorization model still gives appropriate results even without having several training samples. For example, where a system categorizes bird species from photos, some rare species of birds may lack enough pictures to be used in the training images. Consequently, if there is a classifier for bird images, with the insufficient amount of the dataset, a solution would employ FSL.

In some embodiments, a few-shot model uses 100 or fewer input examples, 20 or fewer input examples, 10 or fewer input examples, or 5-7 input examples. The referenced input examples differ from those the model is trained with in that those examples used during the few-shot do not necessarily have any relationship (with the exception of having a comparable data type, like the use of ASCII characters). The training of the model is premised in teaching the model what to do with unknown input examples rather than compare a given input example to each previously observed input to determine a closest match. Rather than evaluate individual inputs, the few-shot model is trained to evaluate few-shots—specifically relationships that exist between the various examples within the few-shot. An example embodiment of the present disclosure is that of evaluating whether a given word belongs to a same language as a few-shot of words. If the few-shot includes a set of examples including 10 dates (e.g., "Nov. 12, 2000", "Oct. 9, 1988", etc.), then the model determines a confidence level that a final input sample belongs to the same language (e.g., is it also a date?).

In some embodiments, the model may predict characters or words. Given the same dates, the model starts predicting (or autocompleting) dates for the next input. For example, after providing "Nov. 12, 2000", and "Oct. 9, 1988" as a support set, then use as a query: "Jan. 2, 19^", then at the caret, the model should predict the characters 8 or 9, as being reasonable for the possible date range, and not, for example, the character M.

Additional models working in tandem with the few-shot language model are able to provide additional context. For example, if the query originates as output from an optical character reader (OCR), the OCR process may provide a confidence level on the missing characters. Where a "9" has a higher confidence than an "8," and combined with the output of the few-shot language model, the next character is most likely a "9" as a result of both models combining to direct toward that particular character.

Previous work relating to few-shot modelling did not make use of language models. Rather those systems were built to perform facial recognition or identify a speaker's voice. Other work relating to few-shot models include the following references:

Yutian Chen, Yannis M. Assael, Brendan Shillingford, David Budden, Scott E. Reed, Heiga Zen, Quan Wang, Luis C. Cobo, Andrew Trask, Ben Laurie, Çaglar Gülçehre, Aaron van den Oord, Oriol Vinyals, and Nando de Freitas. *Sample Efficient Adaptive Text-to-Speech*. CoRR, abs/1809.10460, 2018.

Chelsea Finn, Pieter Abbeel, and Sergey Levine. *Model-Agnostic Metalearning for Fast Adaptation of Deep Networks*. CoRR, abs/1703.03400, 2017.

Gregory R. Koch. *Siamese Neural Networks for One-Shot Image Recognition*. 2015.

Scott E. Reed, Yutian Chen, Thomas Paine, Aaron van den Oord, S. M. Ali Eslami, Danilo Jimenez Rezende, Oriol Vinyals, and Nando de Freitas. *Few-shot Autoregressive Density Estimation: Towards Learning to Learn Distributions*. CoRR, abs/1710.10304, 2017.

Florian Schroff, Dmitry Kalenichenko, and James Philbin. *Facenet: A Unified Embedding for Face Recognition and Clustering*. CoRR, abs/1503.03832, 2015.

Flood Sung, Yongxin Yang, Li Zhang, Tao Xiang, Philip H. S. Torr, and Timothy M. Hospedales. *Learning to*

Compare: *Relation Network for Few-shot Learning.* CoRR, abs/1711.06025, 2017.

Oriol Vinyals, Charles Blundell, Timothy P. Lillicrap, Koray Kavukcuoglu, and Daan Wierstra. *Matching Networks for One Shot Learning.* CoRR, abs/1606.04080, 2016.

In order to execute a few-shot model with a language model the few-shot model needs to be built differently than the above examples. The few-shot model operates on languages. The term "language" in this usage is broader than spoken languages (e.g., English, Spanish, German, etc.). "Language" refers to a category, or data domain, of expression through characters. Belonging to a given language is not specifically based on what the language is, but the customs or traits expressed in that language. Example languages are: street addresses, dates, names of medications, names of humans, names of pets, programming languages, pin numbers, passwords, mathematical expressions, English, Spanish, German, answers contained within a specific filled out form fields, etc.

Languages across a few-shot are detected based on the model's perception of expressed traits within that few-shot. If each entry in the few-shot includes: a two-digit number, a slash, a second two-digit number, a second slash, then a four-digit number, then a final input matching that schema will have a high confidence of belonging to the same language. While the schema described is a common format for representing a date, the few-shot language model has not expressly characterized any of the input as dates. This few-shot model technique of learning-to-learn has the benefit of being agnostic to the choice of model.

FIG. 1 is a block diagram of components included in a few-shot model. The few-shot language model 20 includes of two sub-models: an embedding model 22 and a main language model 24. In some embodiments both the embedding model 22 and the main language model 24 are convolutional models. For example, each sub-model 22,24 may use separable convolutional layers with a 512 feature maps, kernel size 7, depth-multiplier of 4, followed by layer normalization and PReLU nonlinearity layers. One or more samples from the a few-shot set 26 (pictured here as a set of dates) are fed through the embedding model 22. The embedding model 22 produces a fixed-length vector set 28 for including vectors for each member of the few-shot set 26. From the fixed-length vector set 28, a single fixed-width vector ("few-shot vector") 30 is generated for the entire few-shot 26.

The few-shot vector 30 is broadcast-concatenated with a query input 32. In some embodiments the few-shot vector 30 is concatenated with a vector for each individual character of the query input 32. In some embodiments, the few-shot vector 30 is concatenated with a single vector for the entire query sequence 32. The input vector 34 includes both a few-shot vector component 30a, and an input vector component 34a. The combined vector 34 is fed through the main language model 24, which can be any autoregressive model.

Output of the main language model 24 includes an evaluation of a confidence 36 that the query 32 or individual characters of the query belong to the same language as the few-shot 26. The pictured example is an embodiment where individual characters of the query are combined with the few-shot vector 30 and evaluated in progression. In practice multiple queries may be submitted for a given few-shot 26, and multiple evaluations of confidence 36 are computed by the few-shot language model 20. In some embodiments, before inserting the query 32 into the main language model 24, a placeholder indicates the start of the query 36.

Figure 2:
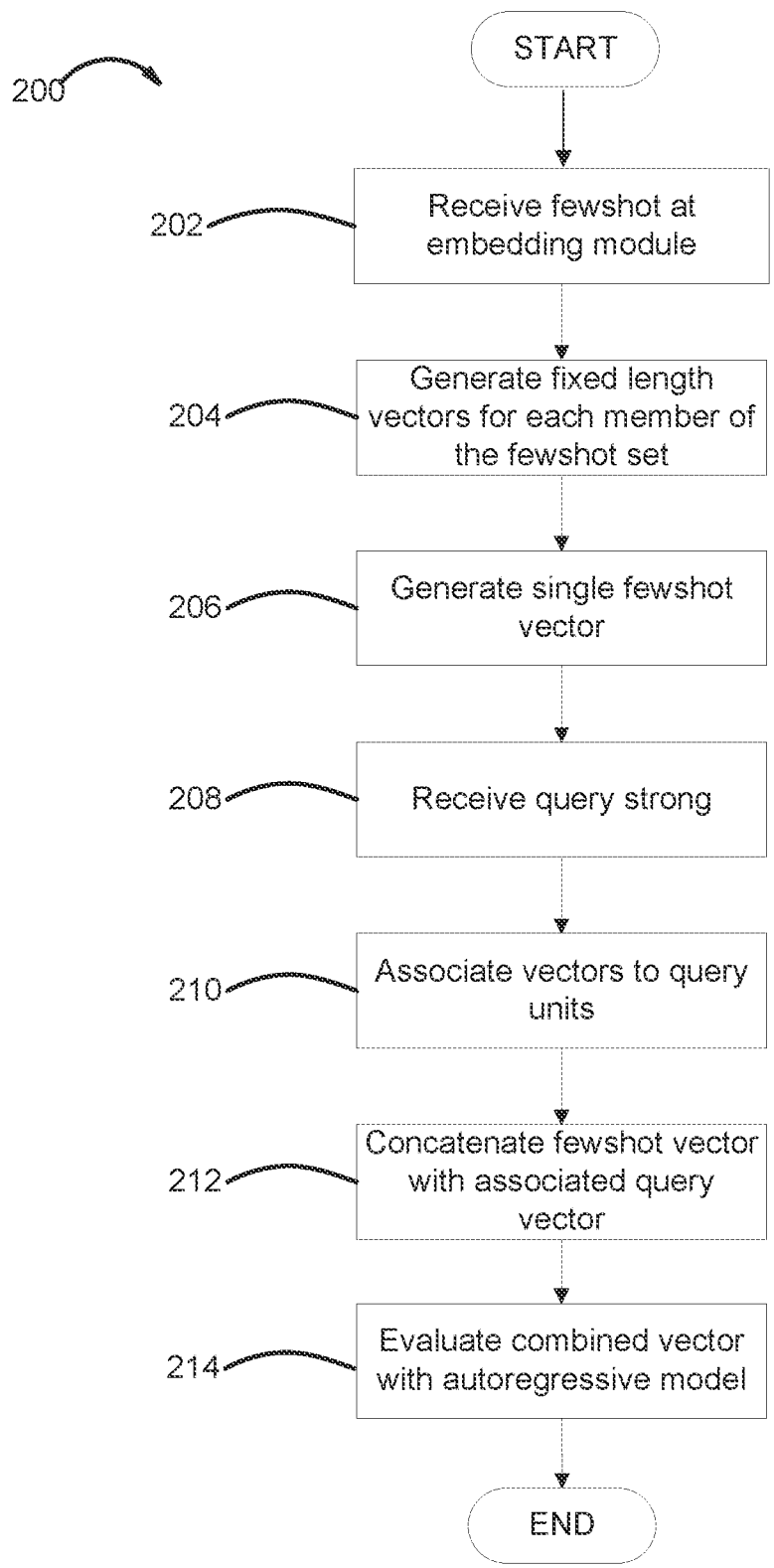
FIG. 2 is a flowchart illustrating evaluation of a language few-shot.

FIG. 2 is a flowchart illustrating evaluation of a language few-shot. In step 202, the embedding model receives a language few-shot. The language few-shot includes a set of examples (e.g., 5-10, 20, <100) of textual content that all belong to the same language. While in some embodiments, a specific language may be specified, the embedding model may operate as language agnostic based on a stipulation that each example of the set belongs to the same but unspecified language.

In step 204, the embedding model generates a fixed length vector for each of the examples included in the few-shot. The embedding model aggregates the variable-length input into a fixed-width vector. An example aggregation may be performed via taking the mean or max along the time dimension. In some embodiments, a sentence embedding layer is used to aggregate the variable-length input using an attention mechanism. However, the exact method for construction of vectors is not critical to the model. In step 206, the embedding vectors for each example from the few-shot set are averaged together to produce a single, few-shot vector.

In step 208, the model receives a query. The query is text similar in data type to the examples within the few-shot. Content of the query may be a sequence of characters (such as ASCII characters). Using the few-shot vector to capture the "essence" of the few-shot, the job of the main language model is to predict the next character given all the previous. In step 210, the language model associates a vector to the query. Depending on how a given query is broken up into units (e.g., phrase, word, character, etc.), each unit of the query is associated with a vector. The practice of associating a vector to a unit of the query is called word embedding and typically involves a simple lookup. There is a different embedding vector for each unit of the query. The unit embeddings are not the same as the embeddings performed by the embedding module described above. Decisions regarding whether characters, words or the entire query is associated with a given vector depend on the main language model configuration.

In step 212, the few-shot vector is broadcast-concatenated with the associated query vector(s). In this manner, the query vector(s) are combined with and include a definitional vector for the language. In step 214, the concatenated vectors are submitted to the main language model. For example, where the query is divided into characters as an operative unit, the query first includes "1" as inserted into the main language model (using the concatenated vector). The model is asked to predict the next character, "0". Then, "10" is passed into the main language model as input and again it predicts the next character "/". Then "10/" predicts "1", and so forth. The main language model predicts the next character (or word or whatever token) given all the previous. The few-shot vector contains information that helps the main language model make the correct predictions.

The output from the main language model is then fed through a softmax layer, and the entire model is trained end-to-end using cross entropy loss. The softmax layer provides a confidence score for the given query. Where a specific query has a confidence score, the model can also output the potential queries that have highest possible scores. The potential query with the highest score is thus the predicted "next" member of a language.

Figure 3:
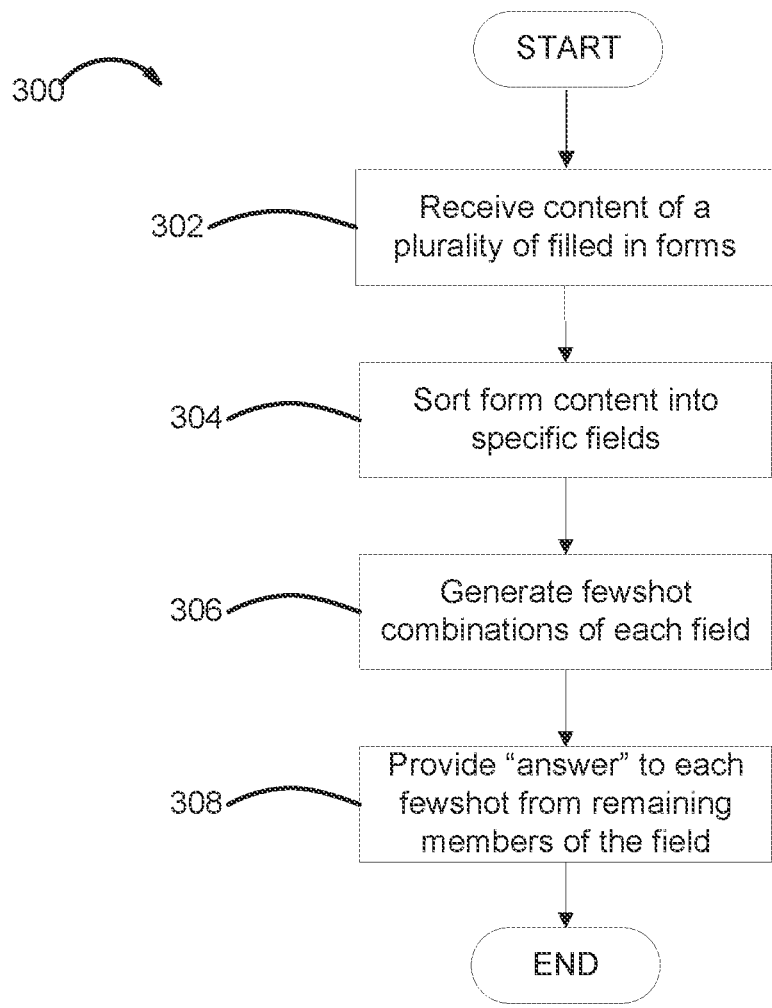
FIG. 3 is a flowchart illustrating a method of training a few-shot language model.

FIG. 3 is a flowchart illustrating a method of training a few-shot language model. In step 302, a plurality of filled in forms are obtained. The forms are digitized in some fashion such that the content of each form is known. In some embodiments, multiple types of forms are collected. The types of forms may span a variety of uses, and entities that make use of the information on those forms. In step 304, the content of the forms is sorted into fields. For example, where a given form has a name field, all of the content of all of the name fields are sorted into a single group of "names." The same is performed for the remaining fields.

Where multiple types of forms are used, where there is overlap in fields, the fields may be sorted together. For example, every form may have a name field; those name fields may be combined. However, some forms might be more specific. Some forms may have a first name field, and a last name field. These fields are not necessarily combined into the same group. The groups of fields that are combined are those certain to be among the same language. In step 306, the training system generates a plurality of sample few-shots by identifying each combination of n items (where n is the specified size of the few-shot) from the groups and submitting those combinations to the model for training. Because each of the few-shot items came from the same field across a plurality of forms, the training can be certain that the content of the few-shot belongs to the same language. For example, if there are 1000 forms, and thus 1000 answers to the name field, if the few-shots are n size 5, there are $_{1000}C_5$ combinations, or $8.25 \times 10^{12}$. The same number of combinations can be generated for each other field on the forms.

The selection of the few-shots does not expressly include metadata that those few-shots are the language of names of the form subject, merely that each set of five belongs to the same language. Further, across few-shots, the model does not necessarily know that any given two few-shots all belong to the same language. The training includes the stipulation that a given set of examples in the specific few-shot all belong to the same language, and then all provided answers also belong to that matching language.

In step 308, the model is provided the "answer(s)" to the few-shot. The answers may be selected as any of the remaining members of the group of filled in fields. Returning to the above example, where there are 1000 forms having a corresponding 1000 name fields, and with 5 examples per few-shot. There are thus, 995 viable answers to provide the model.

The training technique shows the model how to respond to language few-shots, not particularly the aspects of a given language.

Figure 4:
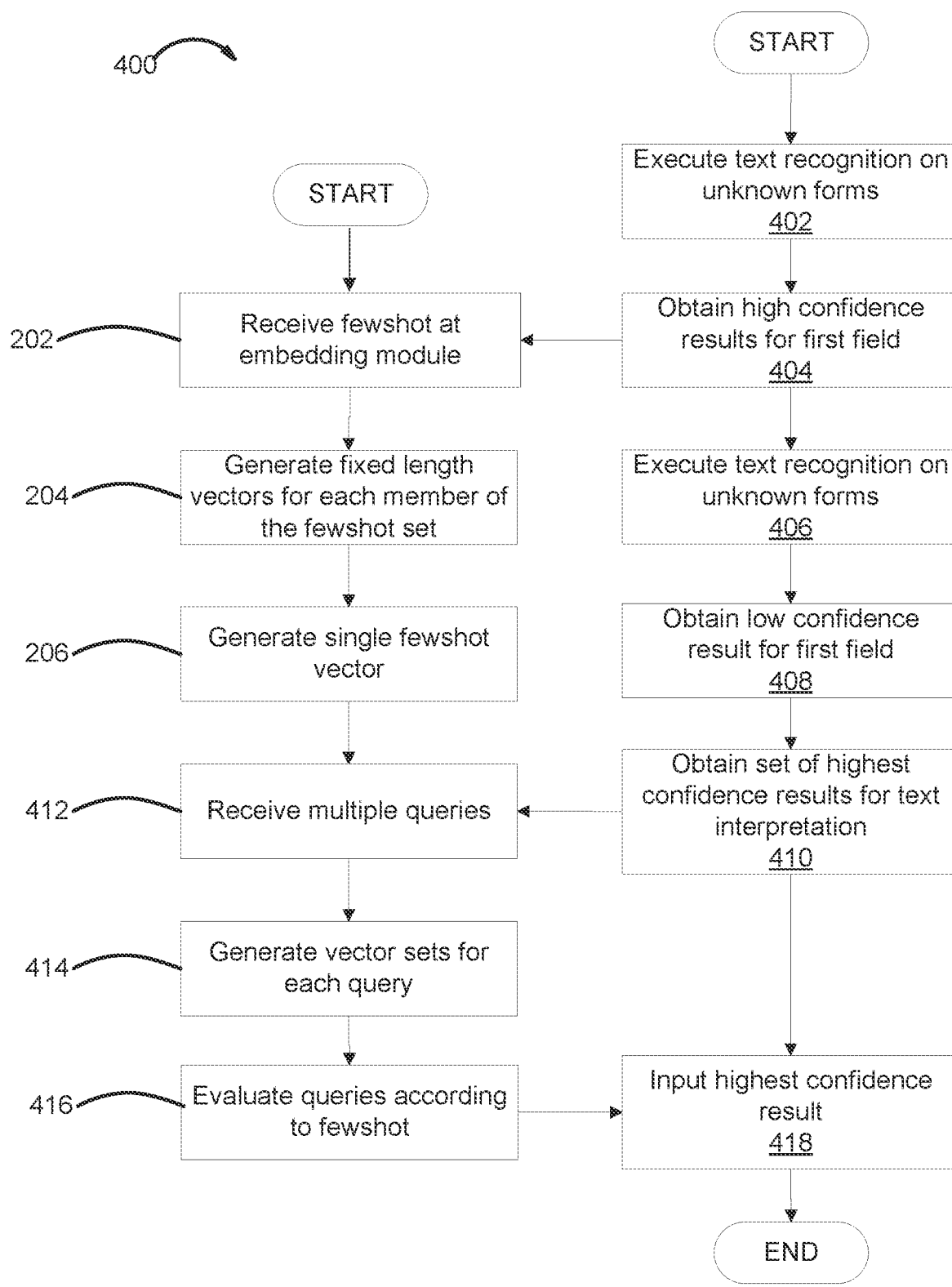
FIG. 4 is a flowchart illustrating coordination between the few-shot language model and another model.

FIG. 4 is a flowchart illustrating coordination between the few-shot language model and another model. The method includes two models working in tandem to one another. One model (steps positioned on the left) is the few-shot language model as described above. Notably, steps 202-206 proceed as described in FIG. 2. A second model (steps positioned on the right) is a text recognition model. Embodiments of the text recognition model may include optical character reading, character interpretation through neural networks/machine learning models.

In step 402, the text recognition model receives and operates upon a number of unknown text documents that feature repeatable characteristics (e.g., a form that has matching fields across each instance of the form, but different filled in answers). The repeatable characteristics of the text documents are each in the same language as pertaining to the few-shot language model. The text recognition model operates on the text documents. In some embodiments, the text recognition model operates on small pieces of the text documents at a time (e.g., image snippets/shreds of the text document). In some embodiments the text to be deciphered is hand written and traditional OCR models struggle providing suitably confident output.

In step 404, the text recognition model generates high confidence results for some subset of the text in the text documents. High confidence text having repeated characteristics across multiple documents are bundled together and provided to the few-shot language model as a few-shot (step 202). For example, where the text documents are a number of forms, and the text recognition model has executed with high confidence on a number of instances of a first field of the forms, the text content of those fields may be used as a few-shot.

In step 406, the text recognition model continues to operate on text documents. Eventually, in step 408, the text recognition model comes to text content it is uncertain of or has a low confidence level for. The text recognition model outputs a number of possible results with respective confidence levels. In step 410, a set of the "best" of the outputs with too low a confidence to satisfy thresholds within the text recognition model are provided to the few-shot language model as a separate query. In step 412, the few-shot language model receives the best options the text recognition model generated (note: those options are still not strong enough for the text recognition model to determine the text content). The few-shot language model runs each of the options as a separate query against the few-shot provided in steps 404.

In step 414, each of the options used as a query has an individual set of vectors concatenated as separate queries through the few-shot language model. In step 416, each of the queries executed on by the few-shot language model results in a confidence score output. The highest confidence score output is delivered to the text recognition model. In step 418, the text recognition model uses the received highest confidence result from the various queries in the few-shot language model as influencing the determined text content of the unknown field of the text document.

Figure 5:
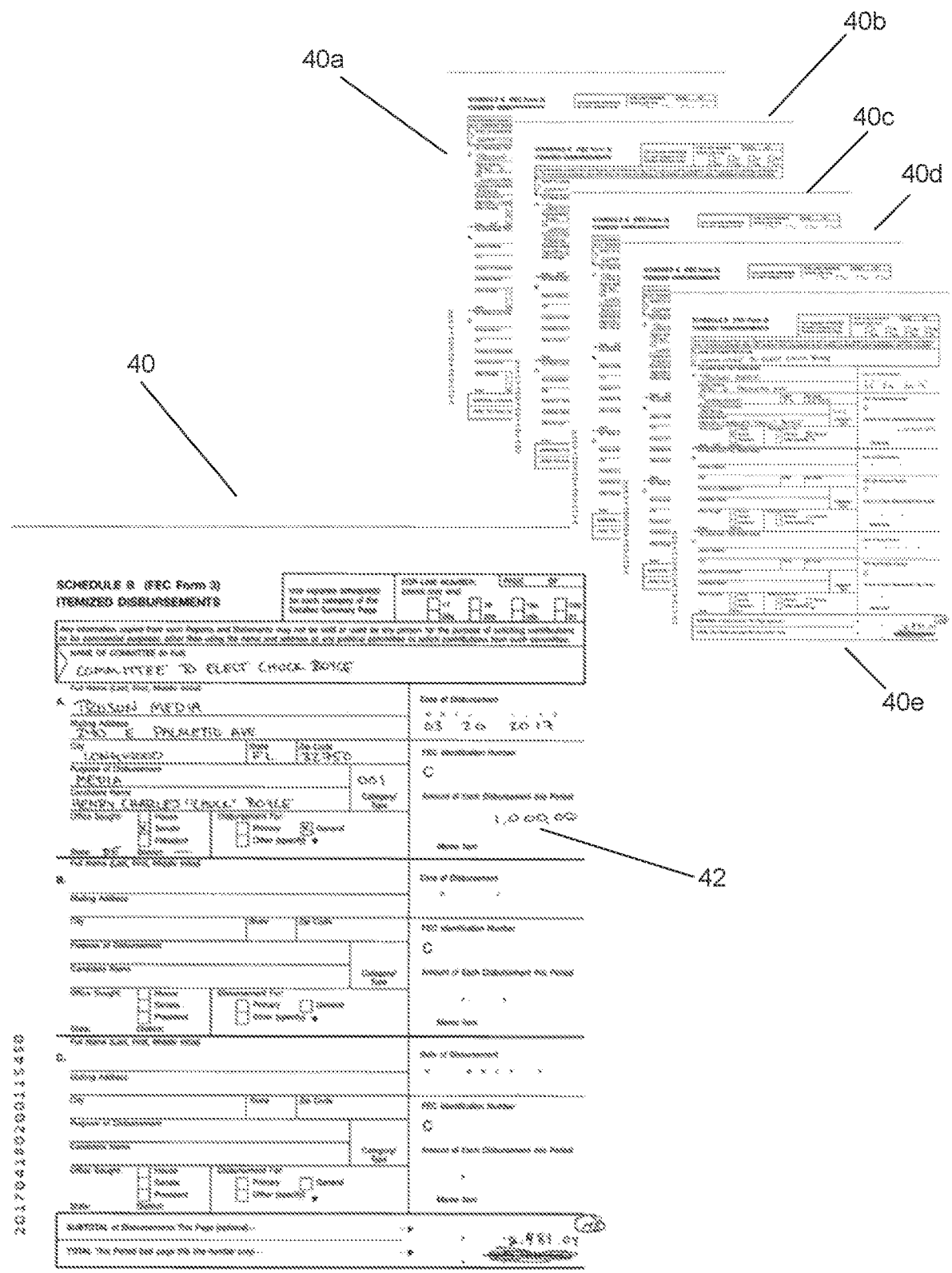
FIG. 5 is an illustrative form instance that serves to illustrate an embodiment of the method of FIG. 4.

FIG. 5 is an illustrative form instance that serves to illustrate an embodiment of the method of FIG. 4. Pictured is a given instance of a form 40. On each instance of the form 40 is an amount field 42. Across multiple instances 40a-40e the amount field 42 was able to be identified beyond a threshold confidence level and entered into a database for future use. However, some forms may not be written so clearly.

Using the data from forms where handwritten text was identified, the few-shot language model can aid in identifying the handwritten text from forms that are not so clear. Sometimes a text recognition model failure is obvious to a human observer. For example, if a field contains only amounts of money, then if the letter "o" is identified instead of a zero, a human will instantly recognize the issue. However, applying a human judgment is time consuming and costly. Thus, the few-shot language model is applied to the situation. As a result that the answers in the same field 42 across instances of the same form 40a-40e should each be in the same language (e.g., an amount of money) the few-shot language model is able to determine that a query including the letter "o" has a low confidence of being correct, and that a query that contains only numbers, commas, decimal points, and possibly dollar signs has a high confidence.

The determination made by the few-shot language model is made without input defining the field beforehand. The input to the few-shot language model is merely the few-shot (e.g., the text content of field 42 of forms 40a-40e) and the queries (e.g., the text guesses of the text recognition model). For example, the field 42 on each respective form may be detected as:

40*a*: $27.53
40*b*: 1250.00
40*c*: 300
40*d*: 1,000
40*e*: $499.99

The final form, for which text recognition confidence was too low to make a determination provides the following possible content:

1: 1,000.00
2: 1,000.00
3: 1.000.00

Each of the possible contents are supplied to the few-shot language model as queries. The query with the highest confidence score as belonging to the same language is provided back to the text recognition model with a confidence score. The text recognition model now has further input regarding the content of the initially low confidence field 42. In some embodiments, the highest confidence provided by the few-shot language model is dispositive on the text content. In other embodiments, multiple models work in tandem to find a most likely candidate for the text content.

Figure 6:
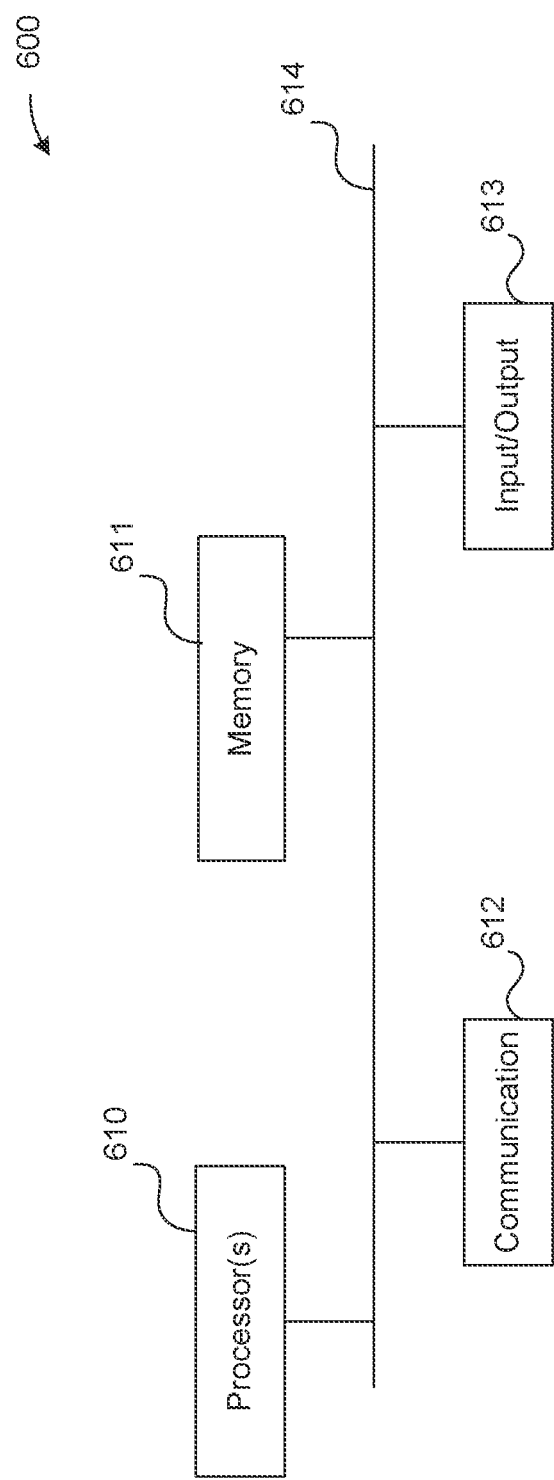
FIG. 6 is a high-level block diagram showing an example of a processing device that can represent a system to run any of the methods/algorithms described above.

FIG. 6 is a high-level block diagram showing an example of a processing device 600 that can represent a system to run any of the methods/algorithms described above. A system may include two or more processing devices such as represented in FIG. 6, which may be coupled to each other via a network or multiple networks. A network can be referred to as a communication network.

In the illustrated embodiment, the processing device 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, scanners, adapters and/or other conventional connection devices. Each processor 610 may be or include, for example, one or more general-purpose programmable microprocessors or microprocessor cores, microcontrollers, application specific integrated circuits (ASICs), programmable gate arrays, or the like, or a combination of such devices. The processor(s) 610 control the overall operation of the processing device 600. Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 610 to execute operations in accordance with the techniques described above. The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of operating a trained language model comprising:
extracting text content from a plurality of filled in forms from a first form field;

training a language model to generate the trained language model by ingesting a multiplicity of training data from the plurality of filled in forms from the first form field in sets including:
  a number of samples; and
  a solution;
providing the trained language model a set of samples of textual content as a few-shot support set that includes non-numeric data and is distinct from the multiplicity of training data, the textual content each belonging to a same language, wherein the set of samples includes fewer than one-hundred samples;
receiving, by the trained language model, a query text content, wherein the samples of textual content of the few-shot support set are averaged and the trained language model is configured to operate on the query text with an averaged output that is a reduction in data of the few-shot support set; and
determining, by the trained language model, a confidence score that the query text content belongs to the same language based on the set of samples of textual content.

2. The method of claim 1, wherein the trained language model does not include input regarding an identification of the same language.

3. The method of claim 1, wherein said extracting and training is performed for each field in the plurality of filled in forms.

4. The method of claim 1, wherein said providing further comprises:
submitting the set of samples to an embedding module which generates a fixed-width vector that describes the set of samples.

5. The method of claim 1, wherein the trained language model is a neural network model.

6. The method of claim 1, further comprising:
executing a character reader model on an unknown text sample;
outputting, by the character reader model, a set of possible text contents for the unknown text sample;
submitting a of the set of possible text contents as the query text content of the trained language model;
comparing the confidence score of each of the set of possible text contents; and
determining that a first possible text content of the set of possible text contents having a highest confidence score is a value for the unknown text sample.

7. The method of claim 1, further comprising:
extracting text content from a plurality of filled in forms from a first form field;
submitting the extracted text to the trained language model; and
identifying a language to use to interpret the first form field.

8. A method comprising:
extracting text content from a plurality of filled in forms from a first form field;
submitting the extracted text to a trained language model;
identifying a language to use to interpret the first form field;
receiving by the trained language model a few-shot sequence of known text strings, wherein the trained language model is trained with a plurality of training data that is distinct from the few-shot sequence of known text strings;
transforming the known text strings into a fixed-width vector;
averaging the fixed-width vectors into a single vector that describes the known text strings and is a reduction in data; and
generating an ordered list of next text strings, wherein each next text string is a text string that is next in the few-shot sequence of known text strings, wherein the ordered list is ranked by a confidence score based on the trained language model using a neural network architecture that has been introduced to a multiplicity of few-shot text string sequences including an introductory sequence and a final text string, the final text string corresponding to the next text strings.

9. The method of claim 8, wherein the few-shot sequence of known text strings all belong to a same language.

10. The method of claim 8, further comprising:
submitting the single vector to a main language model configured to determine a confidence scores for potential next text strings in the ordered list of next test strings.

11. The method of claim 9, wherein the trained language model is a neural network model.

12. A system comprising:
a trained language model stored in memory configured to receive a query text content and a set of samples of textual content, wherein the trained language model is trained with a plurality of training data that is distinct from the set of samples of textual content, the textual content each of the set of samples of textual content belonging to a same language, wherein the set of samples includes fewer than one-hundred samples, wherein the trained language model is configured to determine a confidence score that the query text content belongs to the same language based on the set of samples of textual content and generates a fixed-width vector that describes the set of samples, wherein the trained language model is further configured to determine a query vector for each character of set of characters that comprise the query text content and concatenate the fixed-width vector that describes the set of samples to each of the query vectors, thereby generating concatenated vectors; and
an input console configured to communicate with the trained language model and generate the query text content and the set of samples of textual content.

13. The system of claim 12, wherein the trained language model does not include input regarding an identification of the same language.

14. The system of claim 12, wherein the input console is further configured to extract text content from a plurality of filled in forms from a first form field.

15. The system of claim 12, further comprising:
a character reader model store in memory configured to operate on an unknown text sample and output a set of possible text contents for the unknown text sample, the character reader model further configured to submit the set of possible text contents as the query text content of the trained language model; and
wherein the trained language model is further configured to compare the confidence score of each of the set of possible text contents and determine that a first possible text content of the set of possible text contents having a highest confidence score is a value for the unknown text sample.

* * * * *